UNITED STATES PATENT OFFICE.

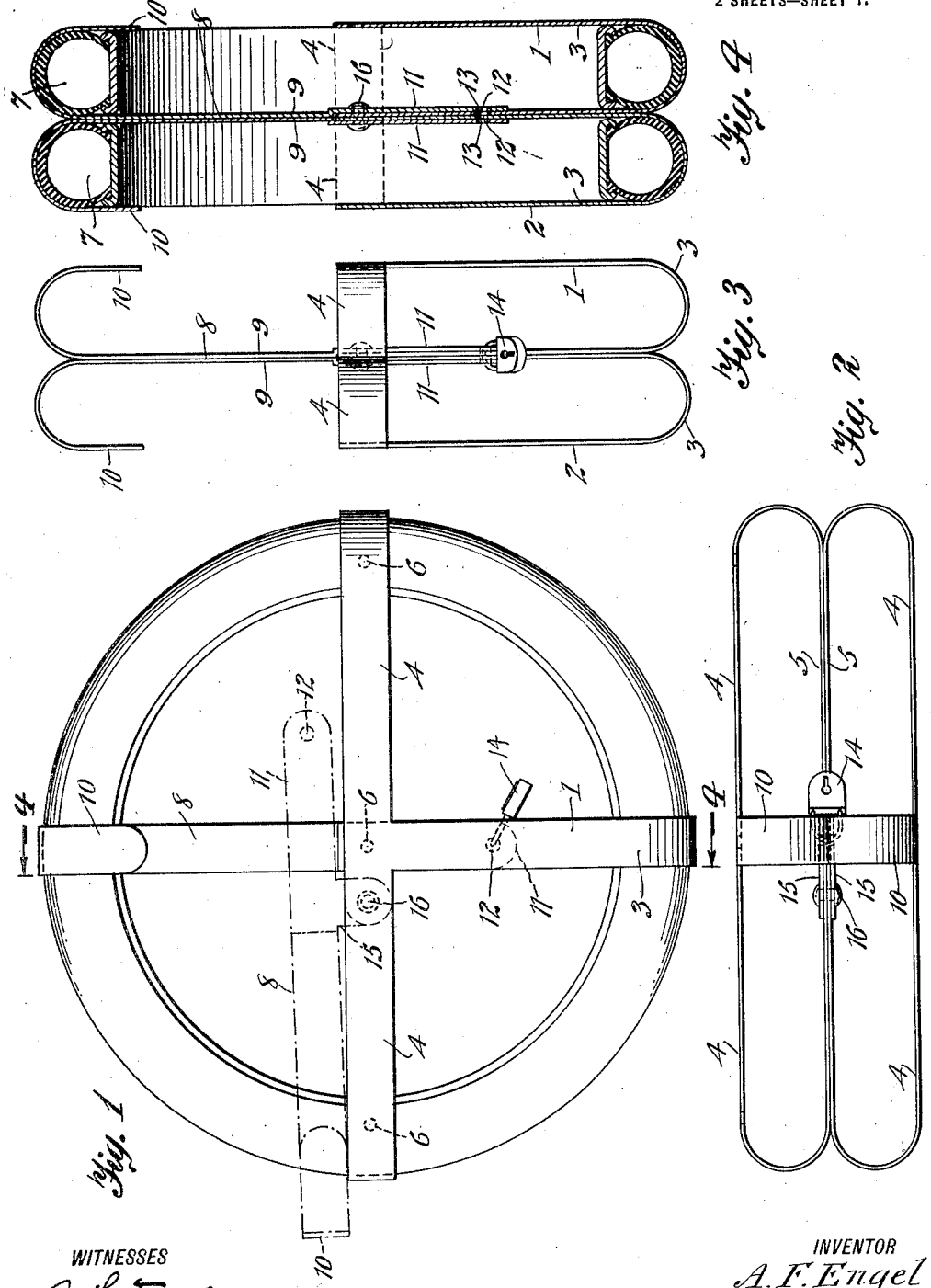

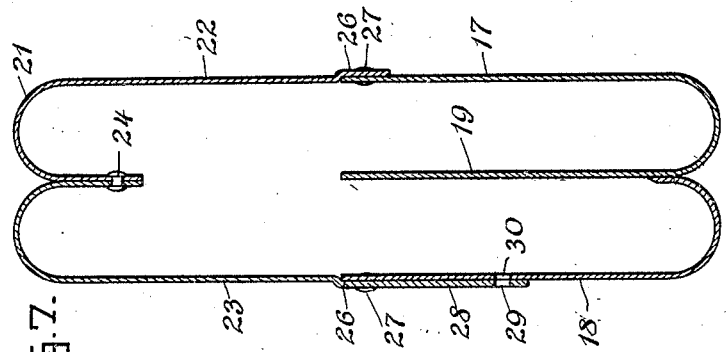
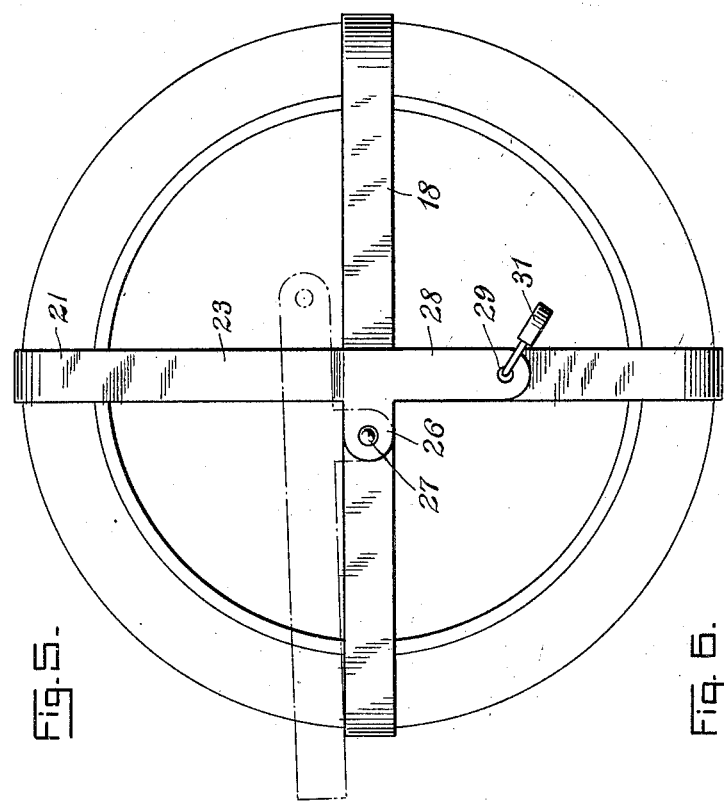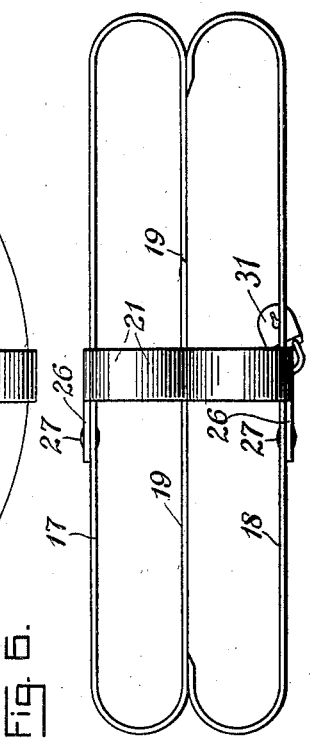

AUGUST FRANK ENGEL, OF DEFIANCE, OHIO.

TIRE-HOLDER.

1,346,083.  Specification of Letters Patent.  Patented July 6, 1920.

Application filed September 5, 1919. Serial No. 321,820.

*To all whom it may concern:*

Be it known that I, AUGUST F. ENGEL, a citizen of the United States, and a resident of Defiance, in the county of Defiance and State of Ohio, have invented new and useful Improvements in Tire-Holders, of which the following is a full, clear, and exact description.

This invention relates to improvements in tire holders, an object of the invention being to provide a tire holder such as is commonly carried on motor vehicles and which permits the ready insertion or removal of the tire and securely holds the tire from accidental displacement therefrom. A further object is to provide a tire holder with an improved holding member which can be swung to one side to provide a free entrance or exit for the tire and which, when moved into normal vertical position and locked in such position, will securely hold the tire against accidental movement.

With these and other objects in view, the invention consists of certain novel features of construction and combinations and arrangements of parts as will be more fully hereinafter described and pointed out in the claims.

In the accompanying drawing,—

Figure 1 is a view in elevation, illustrating in full lines the normal position of parts, and in dotted lines the position of the holding member to permit the tire to be removed or replaced;

Fig. 2 is a top plan view of the tire holder with the tires removed;

Fig. 3 is an edge view taken at right angles to Fig. 2;

Fig. 4 is a view in vertical transverse section on the line 4—4 of Fig. 1; and

Figs. 5, 6 and 7 are views illustrating a modification.

1 and 2 represent tire receiving frames, each frame consisting of a vertical U-shaped member 3 secured in any approved manner to a pair of horizontal U-shaped members 4, the ends of said U-shaped members being so shaped as to fit the tire 7 therein. The horizontal members 4 of the two frames are secured together by means of rivets 6 or other securing device and support a pair of tires 7, which is clearly shown in Figs. 1 and 4. 8 represents my improved tire-holding member which comprises a pair or normally vertical bars 9, 9 having laterally projecting hooked ends 10 which engage the upper portions of the tires to secure them in the frames. The lower portions of the bars 9, 9 are laterally offset, as shown at 11, and straddle the inner vertical portions of the vertical members 3, 3. The ends 11, 11 are made with openings 12 to register with openings 13 in the frame bers 3, 3 and are adapted to receive therein a padlock 14 to lock the holding member in normal position. Laterally projecting perforated lugs 15 are made integral with the ends 11, 11 and are pivotally connected to the supporting frames 1 and 2 at one side of the center thereof, as shown at 16, so that when the holding member 8 is swung to horizontal position, as indicated in dotted lines in Fig. 1, the hooked ends 10 will be out of the way of the tires to allow the latter to be easily inserted or removed.

In the modification illustrated in Figs. 5, 6 and 7, the tire receiving frames 17 and 18 corresponding to frames 1 and 2 are precisely like the same except that but a single intermediate strip 19 is provided at the center.

The tire holding member 21 comprises two strips 22 and 23 having their upper ends curved inwardly and downwardly and secured together as shown at 24. The strips 22 and 23, have perforated lugs 26 pivotally secured to the frames 17 and 18 by rivets 27 and one of said strips has an extension 28 having an opening 29 therein to register with an opening 30 in frame 18 and receive a padlock 31 therein to lock the member 21 against movement.

Various slight changes might be made in the general form and arrangement of the parts described without departing from my invention, and hence I do not limit myself to the precise details set forth but consider myself at liberty to make such changes and alterations as fairly fall within the spirit and scope of the appended claims.

Having thus described my invention, I claim as new and desire to secure by Letters Patent:

1. A tire holder, comprising a tire receiving frame having normally vertical and normally horizontal portions, a holding member pivotally connected to one side of the center of the said horizontal portions, and having one end adapted to be transversely positioned over the upper portion of a tire in the frame.

2. A tire holder, comprising a pair of tire receiving frames, a holding member having transversely projecting tire engaging portions at its upper end, and lugs on the holding member pivotally connected to the frames at one side of their centers.

3. A tire holder, comprising a pair of tire receiving frames, a holding member having hooks at its upper end, lugs on the holding member pivotally connected to the frames at one side of their centers, the lower end of said holding member and one of said frames having openings therein adapted to register when the parts are in normal position, and a padlock in said openings.

4. A tire holder, comprising a pair of tire receiving frames secured together, each frame composed of a vertical and a pair of horizontal U-shaped members, a holding member comprising a pair of bars secured together and having tire-engaging hooks at one end, the other ends of said bars offset laterally and straddling the inner vertical members of the frames, said offset ends and frames having openings adapted to register when the parts are in normal position, a padlock in said openings, arms projecting laterally from said holding member, and a device pivotally connecting said arms to the frames at one side of the center of the frames.

AUGUST FRANK ENGEL.